(12) United States Patent
Tung (10) Patent No.: US 9,373,028 B2
(45) Date of Patent: Jun. 21, 2016

(54) HANDWRITING INPUT SYSTEM AND HANDWRITING INPUT METHOD

(71) Applicants: Qisda (Suzhou) Co., Ltd., Suzhou (CN); Qisda Corporation, Taoyuan (TW)

(72) Inventor: Yu-Teng Tung, Hsinchu (TW)

(73) Assignees: Qisda (Suzhou) Co., Ltd, Suzhou (CN); Qisda Corporation, Taoyuan (TW)

( * ) Notice: Subject to any disclaimer, the term of this patent is extended or adjusted under 35 U.S.C. 154(b) by 0 days.

(21) Appl. No.: 14/689,047

(22) Filed: Apr. 17, 2015

(65) Prior Publication Data

US 2016/0034752 A1 Feb. 4, 2016

(30) Foreign Application Priority Data

Jul. 31, 2014 (TW) .............................. 103126246 A (51) Int. Cl.
*G06K 9/00* (2006.01)
*G06K 9/22* (2006.01)
*G06F 3/0354* (2013.01)
*G06F 3/0338* (2013.01)
*G06F 3/023* (2006.01)
(Continued)

(52) U.S. Cl.
CPC .......... *G06K 9/00429* (2013.01); *G06F 3/0233* (2013.01); *G06F 3/0338* (2013.01); *G06F 3/03545* (2013.01); *G06F 3/041* (2013.01); *G06F 3/04883* (2013.01); *G06K 9/22* (2013.01); *G06K 2209/01* (2013.01)

(58) Field of Classification Search
CPC . G06K 9/00429; G06K 9/22; G06K 2209/01; G06F 3/04883; G06F 3/03545; G06F 3/041; G06F 3/0233; G06F 3/0338

USPC .......... 382/185, 188, 189; 345/156–157, 179; 178/18.01–20.04; 341/5

See application file for complete search history.

(56) References Cited

U.S. PATENT DOCUMENTS

| | | | | |
|---|---|---|---|---|
| 4,878,553 A | * | 11/1989 | Yamanami | G06F 3/046 178/18.07 |
| 5,571,997 A | * | 11/1996 | Gray | G06F 3/03545 178/19.04 |
| 6,067,073 A | * | 5/2000 | Rae-Smith | G06T 11/001 345/589 |

(Continued)

FOREIGN PATENT DOCUMENTS

| CN | 101154135 A | 4/2008 |
|---|---|---|
| CN | 101373539 A | 2/2009 |

(Continued)

*Primary Examiner* — Samir Ahmed
(74) *Attorney, Agent, or Firm* — Ding Yu Tan (57) ABSTRACT

A handwriting input system includes a handwriting pen, a handwriting plate and a processing unit. The handwriting pen includes a pen body, a first sensing unit and a first communication unit. The first sensing unit senses an action of the pen body to generate a sensing data. The handwriting plate includes a touch unit, a display unit and a second communication unit. The touch unit senses a contact trajectory and a contact time while the handwriting pen contacts the handwriting plate. The processing unit is selectively disposed in one of the handwriting pen and the handwriting plate. The processing unit calculates a tilt angle of the pen body according to the sensing data, determines a contact shape according to the tilt angle, determines an ink output amount according to the contact time, and determines a handwriting image according to the contact trajectory, the contact shape and the ink output amount.

15 Claims, 8 Drawing Sheets

(51) Int. Cl.
*G06F 3/041* (2006.01)
*G06F 3/0488* (2013.01)

(56) References Cited

U.S. PATENT DOCUMENTS

| | | | | |
|---|---|---|---|---|
| 7,310,091 B2 * | 12/2007 | Liu | ................... | G06F 3/03545 345/157 |
| 2005/0057535 A1 * | 3/2005 | Liu | ................... | G06F 3/03545 345/179 |
| 2005/0236492 A1 * | 10/2005 | Ladas | ................ | G06F 3/03545 235/494 |
| 2005/0275638 A1 * | 12/2005 | Kolmykov-Zotov | | G06F 3/04883 345/179 |
| 2012/0086664 A1 | 4/2012 | Leto | | |
| 2012/0331546 A1 * | 12/2012 | Falkenburg | ......... | G06F 3/03545 726/16 |

FOREIGN PATENT DOCUMENTS

| | | |
|---|---|---|
| CN | 102436348 A | 5/2012 |
| CN | 103164158 A | 6/2013 |
| TW | 200512653 | 4/2005 |
| TW | 201305859 A1 | 2/2013 |

* cited by examiner

| angle range | contact shape |
|---|---|
| $\theta 1 - \theta 2$ |  |
| $\theta 2 - \theta 3$ |  |
| $\theta 3 - \theta 4$ |  |
| ⋮ | ⋮ |
| $\theta n-1 - \theta n$ |  |

HANDWRITING INPUT SYSTEM AND HANDWRITING INPUT METHOD

BACKGROUND OF THE INVENTION

1. Field of the Invention

The present invention relates to a handwriting input system and a handwriting input method, and more particularly, to a handwriting input system and a handwriting input method for simulating Chinese calligraphy.

2. Description of the Prior Art

As seen so far, the development and application of the handwriting pen and the handwriting plate or pad has become quite popular. A user can hold the handwriting pen to write or paint on the handwriting plate or pad to proceed with handwriting input. As far as the handwriting input is concerned, it is very challenging to simulate Chinese calligraphy, and the core spirit or essence of Chinese calligraphy is on the performance of the contact shape and the ink tinting. The current handwriting input technology of Chinese calligraphy simulation is mainly based on detecting the pressure of handwriting pen being exerted on the handwriting plate/pad and detecting the contact area to determine the contact shape and the ink tinting. Since neither the influence of the tilt angle of the pen body on the contact shape nor the influence of the contact time of the handwriting pen contacting the handwriting pad on the ink tinting are taken into consideration, the prior art therefore is not able to completely simulate the core spirit or essence of Chinese calligraphy.

SUMMARY OF THE INVENTION

One of the purposes of this invention is to provide a handwriting input system and a handwriting input method for simulating the Chinese calligraphy so as to resolve aforementioned problems.

According to one embodiment, the handwriting input system of this invention comprises a handwriting pen, a handwriting plate and a processing unit. The handwriting pen comprises a pen body, a first sensing unit and a first communication unit. Both the first sensing unit and the first communication unit are disposed in the pen body. The first sensing unit senses an action of the pen body to generate a sensing data. The handwriting plate comprises a touch unit, a display unit and a second communication unit. The touch unit senses a contact trajectory and a contact time while the handwriting pen contacts the handwriting plate. The first communication unit communicates with the second communication unit. The processing unit is selectively disposed in one of the handwriting pen and the handwriting plate. The processing unit calculates a tilt angle of the pen body according to the sensing data, determines a contact shape according to the tilt angle, determines an ink output amount according to the contact time, and determines a handwriting image according to the contact trajectory, the contact shape and the ink output amount. The display unit then displays the handwriting image.

According to another embodiment, the handwriting input method of this invention is applied in a handwriting input system which comprises a handwriting pen and a handwriting plate. The handwriting input method comprises the steps of: sensing an action of the pen body to generate a sensing data; sensing a contact trajectory and a contact time while the handwriting pen contacts the handwriting plate; calculating a tilt angle of the handwriting pen according to the sensing data, determining a contact shape according to the tilt angle, determining an ink output amount according to the contact time, and determining a handwriting image according to the contact trajectory, the contact shape and the ink output amount; and displaying the handwriting image.

In conclusion, when a user holds the handwriting pen to write the Chinese calligraphy on the handwriting plate, in this invention the act of the handwriting pen is sensed to calculate the tilt angle of the handwriting pen, and the contact trajectory and the contact time are sensed while the handwriting pen contacts the handwriting plate. Then the contact shape is determined according to the tilt angle, the ink output amount is determined according to the contact time, and the handwriting image is determined according to the contact trajectory, the contact shape and the ink output amount. Since in this invention the contact shape and the ink output amount are determined according to the tilt angle and the contact time, respectively, the contact shape and the ink output amount for each motion of the handwriting pen are dynamically adjusted so as to simulate the core spirit of the Chinese calligraphy as much as possible.

These and other objectives of the present invention will no doubt become obvious to those of ordinary skill in the art after reading the following detailed description of the preferred embodiment that is illustrated in the various figures and drawings.

DETAILED DESCRIPTION OF PREFERRED EMBODIMENTS

Figure 1:
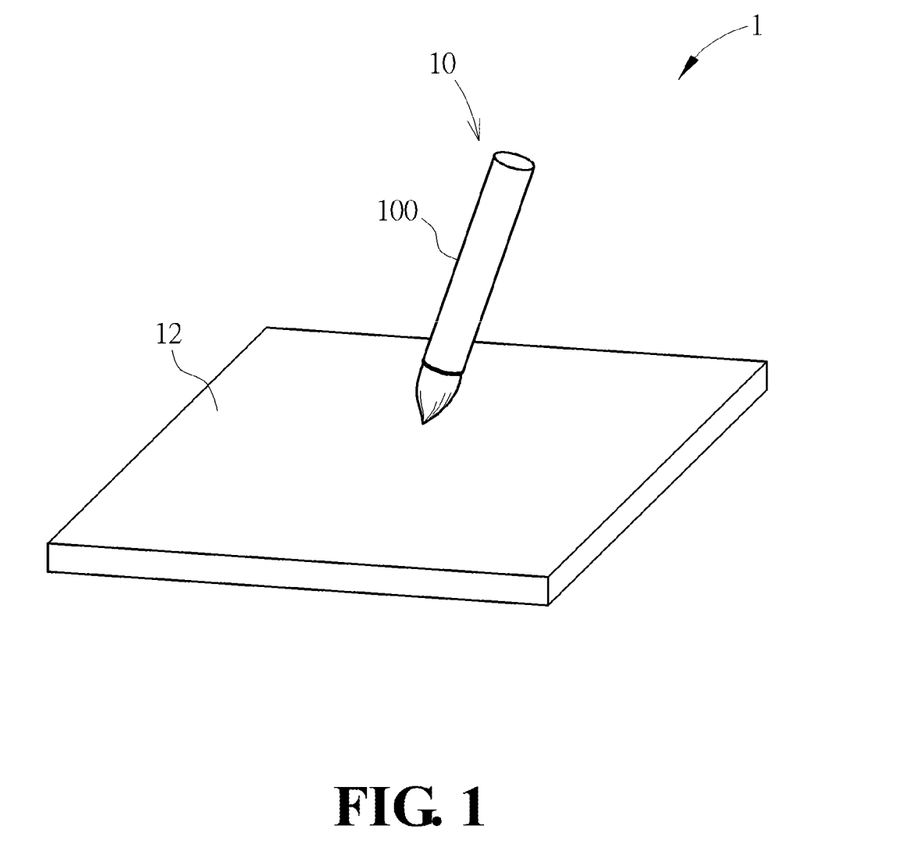
FIG. 1 is an illustrative diagram of a handwriting input system according to an embodiment of the present invention.
Figure 2:
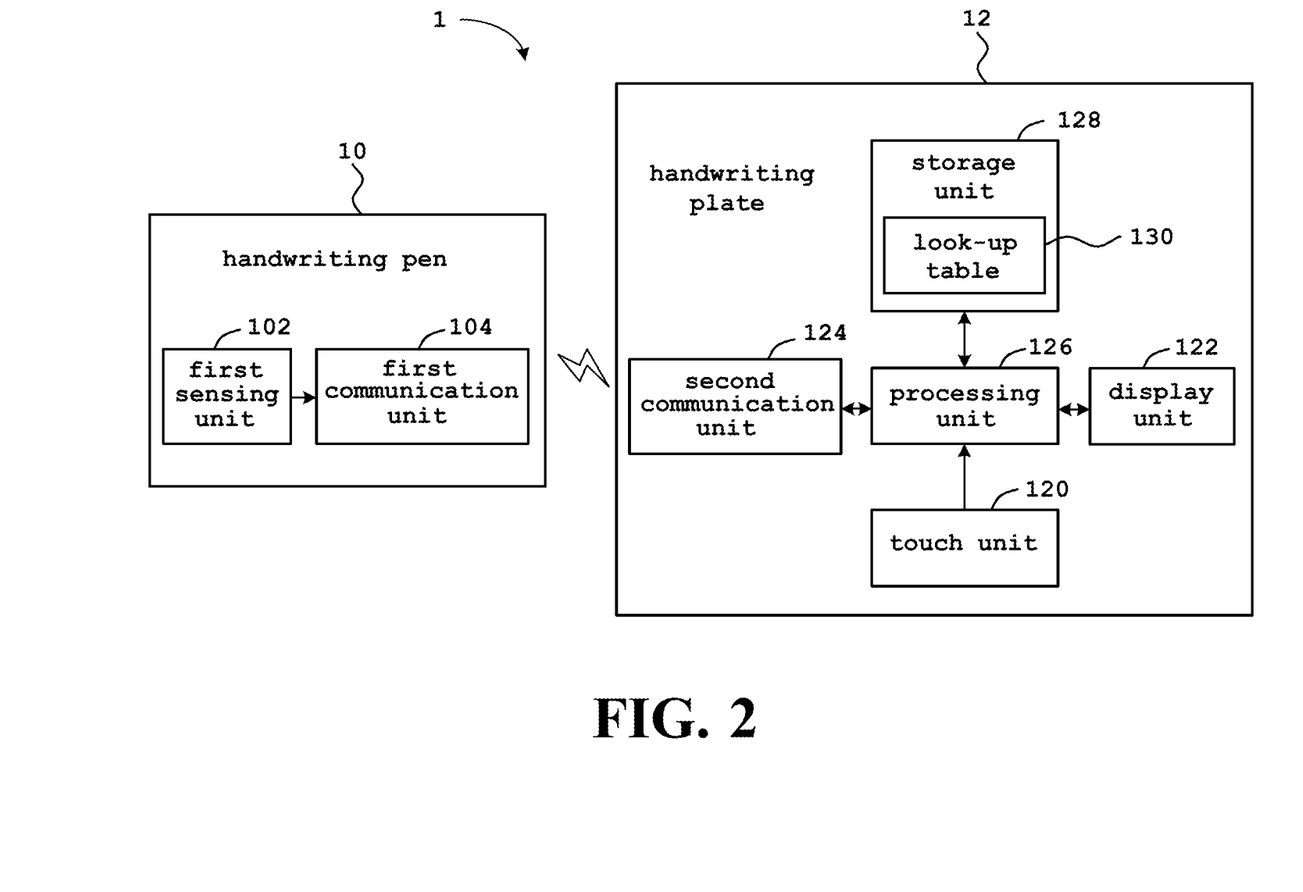
FIG. 2 is a block diagram of the handwriting input system shown in FIG. 1.
Figure 3:
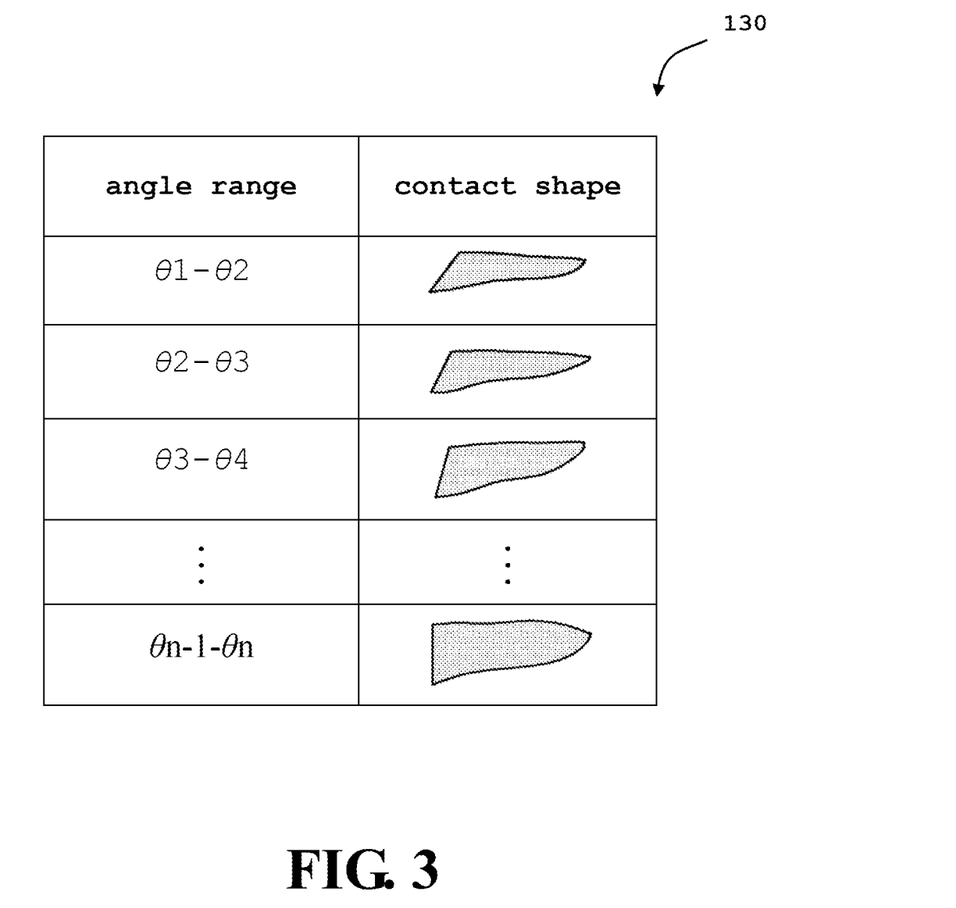
FIG. 3 is an illustrative diagram of the look-up table shown in FIG. 2.
Figure 4:
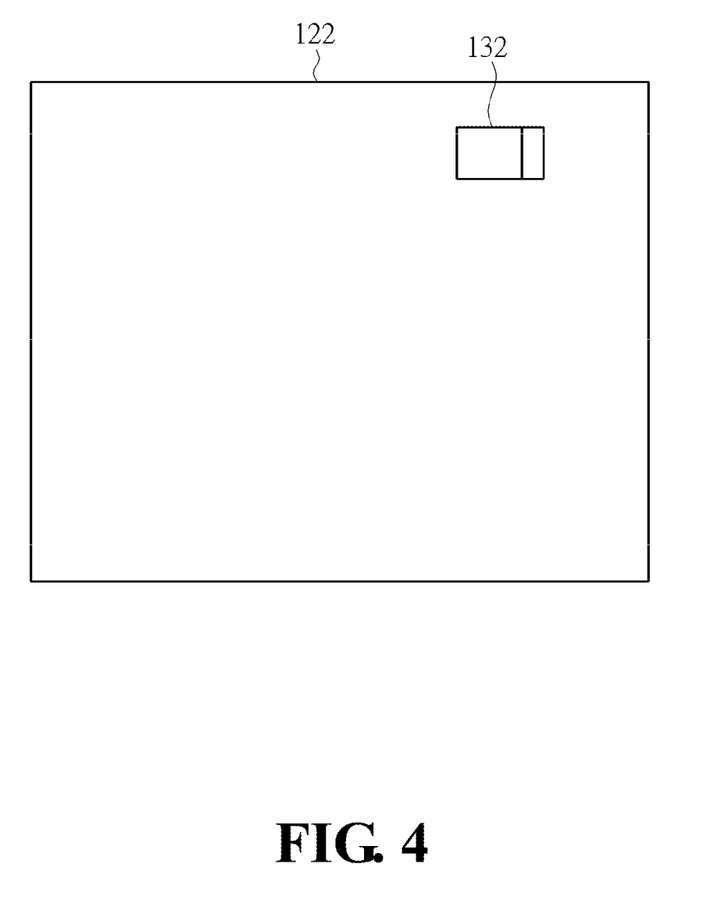
FIG. 4 is an illustrative diagram of the display unit shown in FIG. 2 displaying a virtual ink palette.
Figure 5:
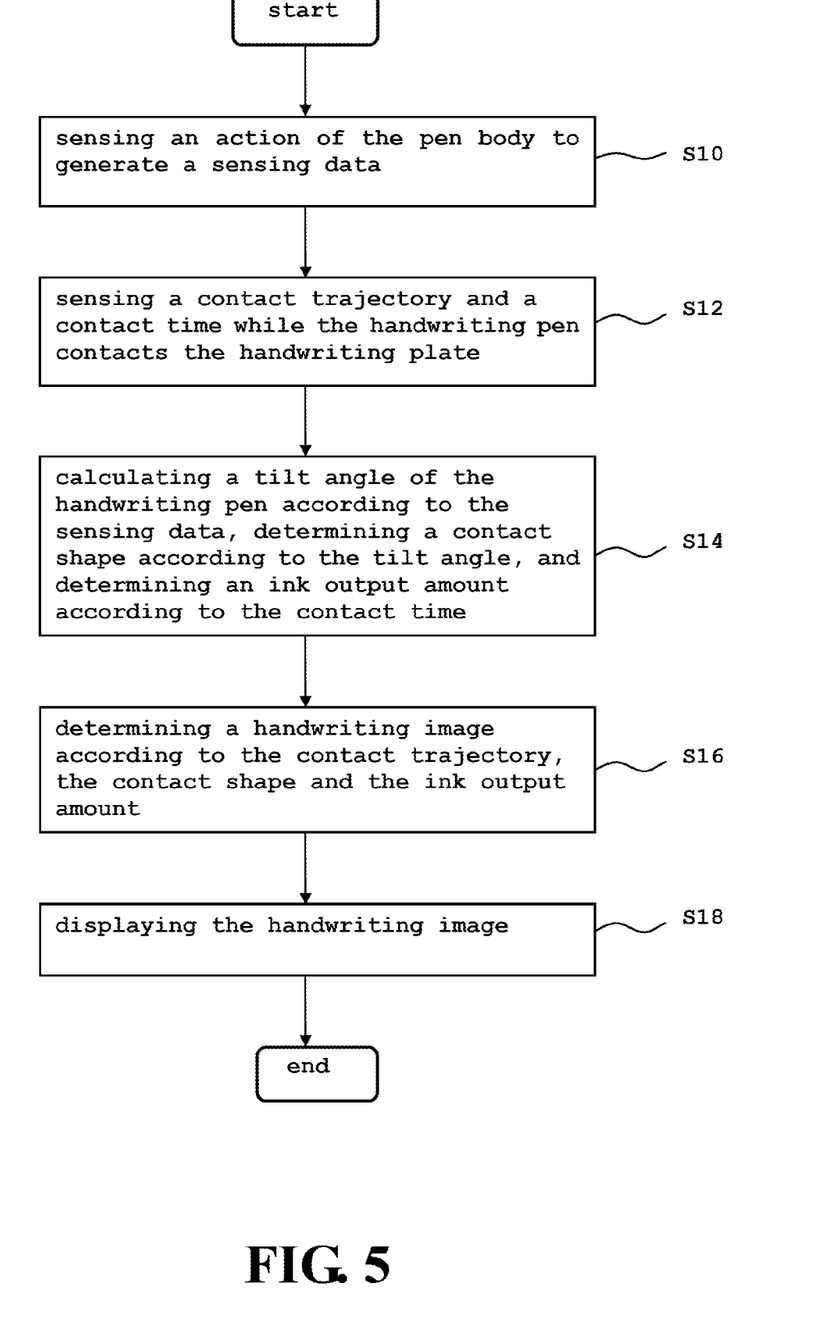
FIG. 5 is a flow chart of a handwriting input method according to an embodiment of the present invention.

Please refer to FIG. 1 to FIG. 5. FIG. 1 is an illustrative diagram of a handwriting input system 1 according to an embodiment of the present invention. FIG. 2 is a block diagram of the handwriting input system 1 shown in FIG. 1. FIG. 3 is an illustrative diagram of the look-up table 130 shown in FIG. 2. FIG. 4 is an illustrative diagram of the display unit 122 shown in FIG. 2 displaying a virtual ink palette 132. FIG. 5 is a flow chart of a handwriting input method according to an embodiment of the present invention. The handwriting input method shown in FIG. 5 is suitable for the handwriting input system 1 shown in FIG. 1 and FIG. 2.

As shown in FIG. 1 and FIG. 2, the handwriting input system 1 comprises a handwriting pen 10, a handwriting plate 12 and a processing unit 126. The handwriting pen 10 comprises a pen body 100, a first sensing unit 102 and a first communication unit 104. The first sensing unit 102 and the first communication unit 104 are both disposed in the pen body 100, and electrically connected with each other. In this embodiment, the processing unit 126 is disposed in the handwriting plate 12, and the handwriting plate 12 further comprises a touch unit 120, a display unit 122, a second communication unit 124 and a storage unit 128. The processing unit 126 is electrically connected to the touch unit 120, the display unit 122, the second communication unit 124 and the storage unit 128. The second communication unit 124 and the first communication unit 104 can communicate with each other via wired or wireless communication technologies. Since the wired and wireless communication technologies are well known by the persons having ordinary skill in the art, they are not described in details herein.

In practical application, the first sensing unit 102 may be a gyroscope, a gravity sensor or the like; the touch unit 120 may be a touch panel; the display unit 122 maybe a LCD display or other display; the processing unit 126 may be a processor or a controller with data processing ability; and the storage unit 128 may be a memory, a hard disc or other data storage device. In the present embodiment, the storage unit 128 stores a look-up table 130. As shown in FIG. 3, the look-up table 130 records a plurality of angle ranges and a plurality of contact shapes, and each of the angle ranges corresponds to one of the contact shapes (that is shown in FIG. 3 adjacent to the right hand side of the corresponding angle range).

When the user holds the handwriting pen 10 to write Chinese calligraphy on the handwriting plate 12, the first sensing unit 102 senses an action of the pen body 100 to generate a sensing data as shown in the step S10 of FIG. 5, and the touch unit 120 of the handwriting plate 12 senses a contact trajectory and a contact time while the handwriting pen 10 contacts the handwriting plate 12 as shown in the step S12 of FIG. 5, and the sensing data is transmitted to the handwriting plate 12 through the second communication unit 124 and the first communication unit 104. Then the processing unit 126 calculates a tilt angle of the pen body 100 according to the sensing data, and determines a contact shape by looking up the look-up table 130 according to the tilt angle as shown in the step S14 of FIG. 5. For example, if the tilt angle of the pen body 100 falls within the angle range θ2-θ3, the processing unit 126 determines the contact shape which corresponds to the angle range θ2-θ3. Besides, the processing unit 126 determines an ink output amount according to the contact time as shown in the step S14 of FIG. 5. Finally, the processing unit 126 determines a handwriting image according to the contact trajectory, the contact shape and the ink output amount as shown in the step S16 of FIG. 5, and controls the display unit 122 to display the handwriting image as shown in the step S18 of FIG. 5.

In the present embodiment, when the contact time is less than a threshold, say for example, 3 seconds, the ink output amount increases as the contact time increases. When the contact time is greater than or equal to the threshold, the ink output amount is kept at a constant value. Please refer to Table 1 below as well. Table 1 shows the relationship among the residual ink amount, the contact time and the ink output amount, wherein the relation of the residual ink amounts is I1>I2>I3>I4, the relation of the contact time is T1<T2<T3<T4, and the relation of the ink output amount is A>B>C>D. Suppose that the ink output amount A is the upper limit of the ink amount which is actually absorbed by a sheet of paper, and the residual ink amount is the ink amount which is actually absorbed by the Chinese writing brush for a single ink supplementation. When the residual ink amount is sufficient, say for example, residual ink amount I1, the ink output amount A can be supplied no matter how long the contact time is. As the writing time goes by, the residual ink amount decreases. If the contact time is short, the ink output amount decreases accordingly. At this moment, the user may increase the contact time for each motion of the handwriting pen 10 so as to increase the ink output amount. Take the residual ink amount I3 in Table 1 for example. The threshold of the contact time is T3. When the contact time is less than T3, the ink output amount increases as the contact time increases, and when the contact time is greater than or equal to T3, the ink output amount is kept constant.

TABLE 1

|  | contact time T1 | contact time T2 | contact time T3 | contact time T4 |
| --- | --- | --- | --- | --- |
| residual ink amount I1 | ink output amount A | ink output amount A | ink output amount A | ink output amount A |
| residual ink amount I2 | ink output amount B | ink output amount A | ink output amount A | ink output amount A |
| residual ink amount I3 | ink output amount C | ink output amount B | ink output amount A | ink output amount A |
| residual ink amount I4 | ink output amount D | ink output amount C | ink output amount B | ink output amount A |

Further, the ink output amount decreases as the total contact time of the handwriting pen 10 contacting the handwriting plate 12 increases. As shown in Table 1, if the residual ink amount before the first motion of the handwriting pen 10 is the residual ink amount I1 and the contact time of the first motion is T1, the ink output amount is the ink output amount A. If the residual ink amount before the second motion of the handwriting pen 10 is residual ink amount I2 and the contact time of the second motion is still T1, since the total contact time increases to be 2T1, the ink output amount decreases to be the ink output amount B so as to present or produce the effect of ink tinting variation. If the same ink output amount is desired to be maintained, the user simply increases the contact time of the second motion to be T2.

As shown in FIG. 4, the display unit 122 displays a virtual ink palette 132 for the user to recover the total ink amount back to the original state (where the ink amount is at original maximum amount). When the user uses the handwriting pen 10 to continuously write on the handwriting plate 12 for a period of time, the handwriting image may become blurred or indistinct since the residual ink amount may not be enough (for producing sufficiently distinct handwriting image). At this time, the user can holds the handwriting pen 10 to click or tap on the virtual ink palette 132 so as to recover the total ink amount, i.e. to make ink refilling so as to keep writing. Since in this invention the contact shape of the handwriting pen 10 is determined according to the tilt angle of the handwriting pen 10 held by the user and the ink output amount is determined according to the contact time, the contact shape and the ink output amount for each motion of the handwriting pen 10 are dynamically adjusted so as to simulate the core spirit of Chinese calligraphy as much as possible.

In another embodiment, when the handwriting pen 10 contacts the handwriting plate 12, the processing unit 126 further calculates the speed of the handwriting pen 10 according to the sensing data, and determines the contact shape according to the tilt angle and the speed of the handwriting pen 10. In other words, in addition to aforementioned determination of the contact shape according to the tilt angle of the handwriting pen 10, in this invention, the contact shape may alternatively be determined according to both the tilt angle and the speed of the handwriting pen 10. Thus, when the user holds the handwriting pen 10 to move downward rapidly to contact the handwriting plate 12, in the invention, the ink sputtering effect is generated according to the tilt angle and the speed of the pen body 100. To the contrary, when the user holds the handwriting pen 10 to move downward slowly to contact the handwriting plate 12, in the invention, the ink sputtering effect is not generated. Therefore, as a result, the core spirit of Chinese calligraphy is highly simulated.

Figure 6:
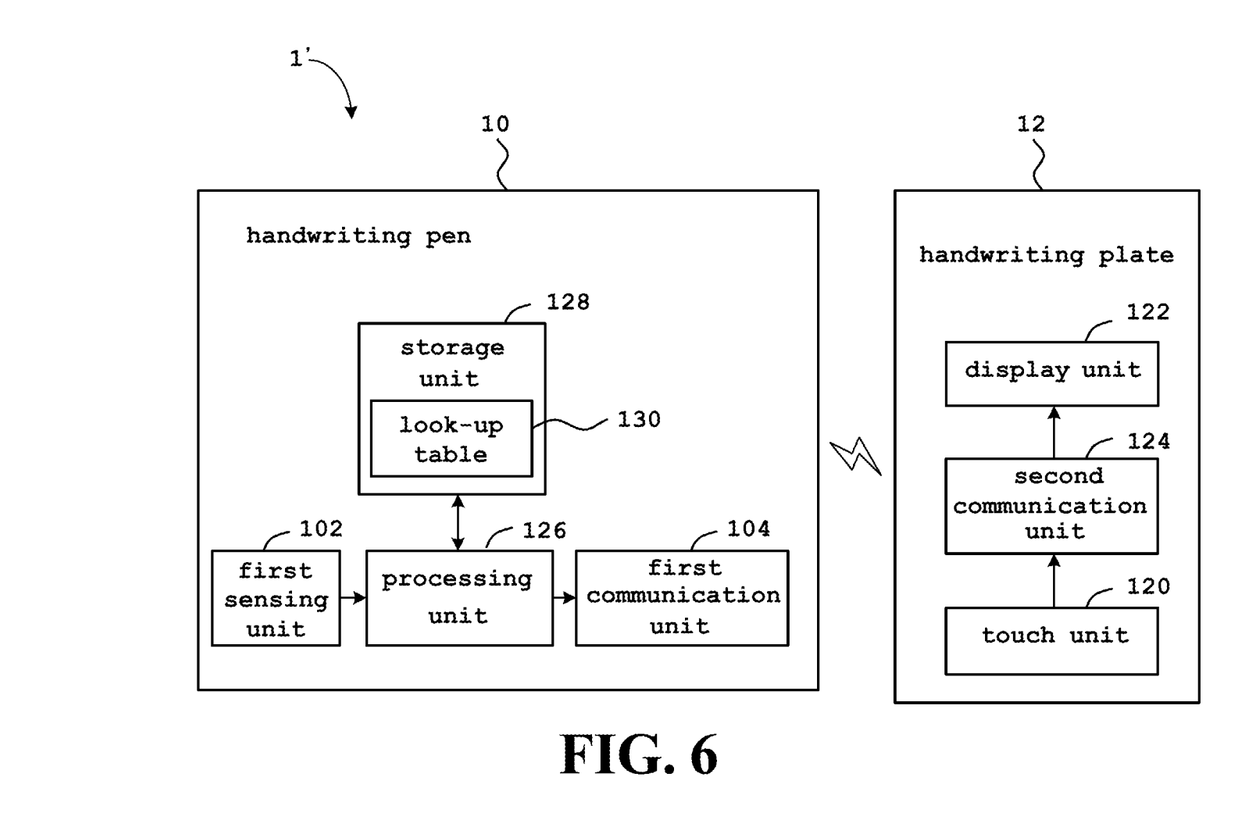
FIG. 6 is a block diagram of a handwriting input system according to another embodiment of the present invention.

Please refer to FIG. 6. FIG. 6 is a block diagram of a handwriting input system 1' according to another embodiment of the present invention. The difference between the handwriting input system 1' and the handwriting input system 1 is that the processing unit 126 and the storage unit 128 are disposed in the handwriting pen 10 and electrically connected to the first sensing unit 102 and the first communication unit 104 in the handwriting input system 1' of FIG. 6. In other words, in the present invention, the processing unit 126 and the storage 128 may be selectively disposed in one of the handwriting pen 10 and the handwriting plate 12 to proceed with aforementioned processing procedures or steps. Please note that the components shown in FIG. 6 with the same labeling numbers as those shown in FIG. 2 operate in substantially the same way and are not repeatedly described in details herein.

Figure 7:
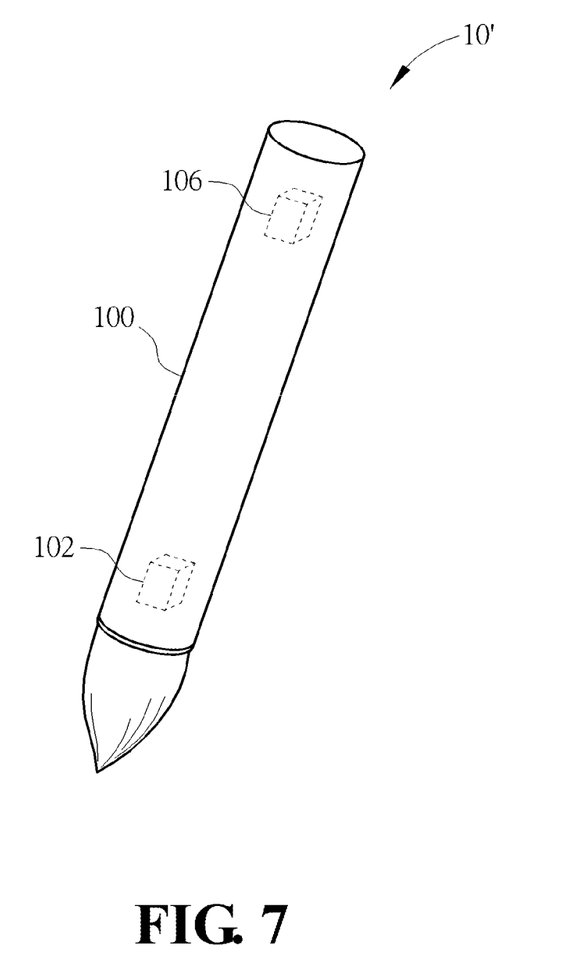
FIG. 7 is an illustrative diagram of a handwriting pen according to another embodiment of the present invention.

Please refer to FIG. 7. FIG. 7 is an illustrative diagram of a handwriting pen 10' according to another embodiment of the present invention. The difference between the handwriting pen 10' and aforementioned handwriting pen 10 is that the handwriting pen 10' further comprises a second sensing unit 106, and the first sensing unit 102 and the second sensing unit 106 are disposed in two opposite ends of the pen body 100. In the present embodiment, the first sensing unit 102 and the second sensing unit 106 together sense the actions of the pen body 100 to generate aforementioned sensing data. Thus, wherever the user holds the pen body 100 to write, the accuracy of the sensing data can be maintained. Please note that the components shown in FIG. 7 with the same labeling numbers as those shown in FIG. 2 operate in substantially the same way, and are not repeatedly described in details herein.

Figure 8:
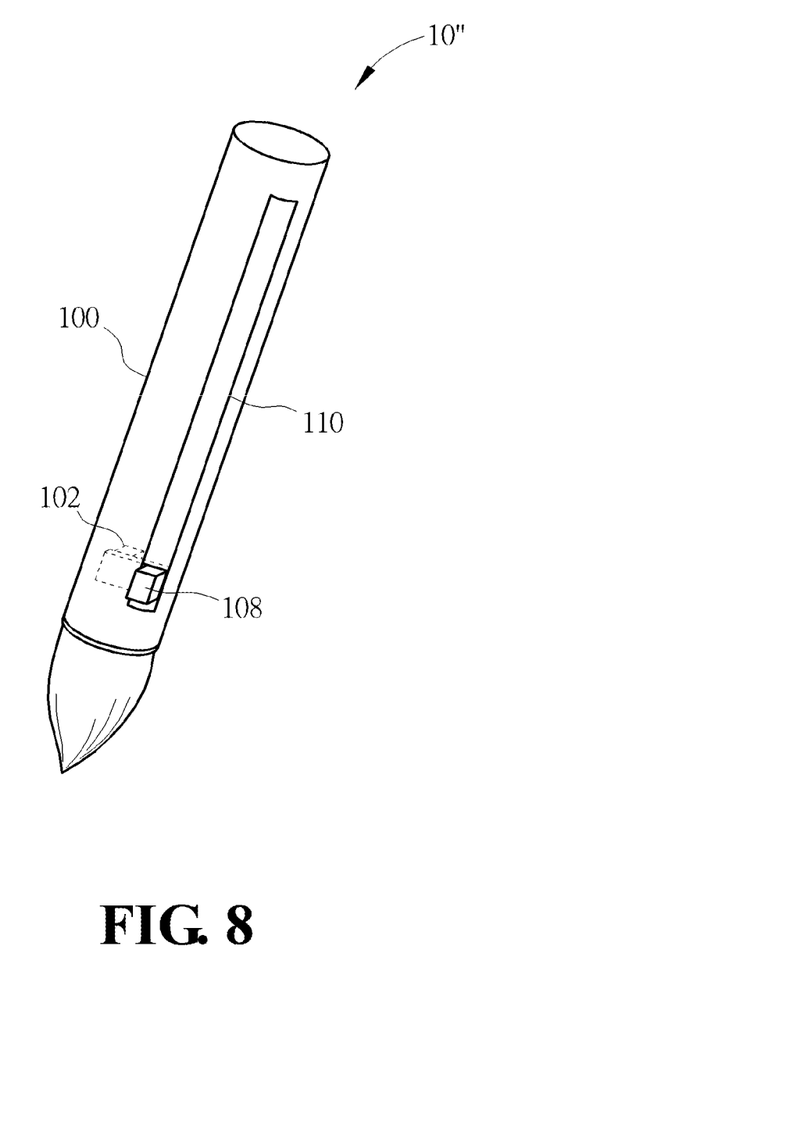
FIG. 8 is an illustrative diagram of a handwriting pen according to another embodiment of the present invention.

Please refer to FIG. 8. FIG. 8 is an illustrative diagram of a handwriting pen 10" according to another embodiment of the present invention. The differences between the handwriting pen 10" and the aforementioned handwriting pen 10 are that the handwriting pen 10" further comprises a position adjustment member 108, the pen body 100 has a slide rail 110, the position adjustment member 108 is moveably disposed on the slide rail, and the first sensing unit 102 is disposed on the position adjustment member 108. In the present embodiment, the user may move the position adjustment member 108 to slide relative to the slide rail 110 so as to adjust the first sensing unit 102 to a proper position corresponding to where the handwriting pen 10" is held by the user to maintain the accuracy of the sensing data. Please note that the components shown in FIG. 8 with the same labeling numbers as those shown in FIG. 2 operate in substantially the same way and are not repeatedly described in details herein.

In conclusion, when a user holds the handwriting pen to write Chinese calligraphy on the handwriting plate, in this invention the action or motion of the handwriting pen is sensed to calculate the tilt angle of the handwriting pen, and the contact trajectory and the contact time are sensed while the handwriting pen contacts the handwriting plate. Then the contact shape is determined according to the tilt angle, the ink output amount is determined according to the contact time, and the handwriting image is determined according to the contact trajectory, the contact shape and the ink output amount. Since in this invention the contact shape and the ink output amount are determined according to the tilt angle and the contact time, respectively, the contact shape and the ink output amount for each motion of the handwriting pen are dynamically adjusted so as to simulate the core spirit of Chinese calligraphy as much as possible.

Those skilled in the art will readily observe that numerous modifications and alterations of the device and method may be made while retaining the teachings of the invention.

What is claimed is:

1. A handwriting input system comprising:
   a handwriting pen comprising a pen body, a first sensing unit and a first communication unit, the first sensing unit and the first communication unit being disposed in the pen body, the first sensing unit sensing an action of the pen body to generate a sensing data;
   a handwriting plate comprising a touch unit, a display unit and a second communication unit, the touch unit sensing a contact trajectory and a contact time while the handwriting pen contacts the handwriting plate, the first communication unit communicating with the second communication unit; and
   a processing unit selectively disposed in one of the handwriting pen and the handwriting plate, the processing unit calculating a tilt angle of the pen body according to the sensing data, determining a contact shape according to the tilt angle, determining an ink output amount according to the contact time, and determining a handwriting image according to the contact trajectory, the contact shape and the ink output amount, and the display unit displaying the handwriting image.

2. The handwriting input system of claim 1, wherein the processing unit is disposed in the handwriting pen and electrically connected to the first sensing unit and the first communication unit.

3. The handwriting input system of claim 1, wherein the processing unit is disposed in the handwriting plate and electrically connected to the touch unit, the display unit and the second communication unit.

4. The handwriting input system of claim 1, further comprising a storage unit electrically connected to the processing unit, wherein the storage unit stores a look-up table, the look-up table records a plurality of angle ranges and a plurality of contact shapes, and each of the angle ranges corresponds to one of the contact shapes.

5. The handwriting input system of claim 1, wherein when the contact time is less than a threshold, the ink output amount increases as the contact time increases, and when the contact time is greater than or equal to the threshold, the ink output amount is kept constant.

6. The handwriting input system of claim 1, wherein the ink out amount decreases as a total contact time of the handwriting pen contacting the handwriting plate increases.

7. The handwriting input system of claim 1, wherein the display unit displays a virtual ink palette for recovering a total ink amount.

8. The handwriting input system of claim 1, wherein the handwriting pen further comprises a second sensing unit, the first sensing unit and the second sensing unit are disposed at opposite two ends of the pen body, and the first sensing unit and the second sensing unit together sense the action of the pen body to generate the sensing data.

9. The handwriting input system of claim 1, wherein the handwriting pen further comprises a position adjustment member, the pen body has a slide rail, the position adjustment member is moveably disposed on the slide rail, and the first sensing unit is disposed on the position adjustment member.

10. The handwriting input system of claim 1, wherein when the handwriting pen contacts the handwriting plate, the processing unit calculates a speed of the pen body according to the sensing data, and determines the contact shape according to the tilt angle and the speed.

11. A handwriting input method applied in a handwriting input system, the handwriting input system comprising a handwriting pen and a handwriting plate, the method comprising:

sensing an action of the pen body to generate a sensing data;

sensing a contact trajectory and a contact time while the handwriting pen contacts the handwriting plate;

calculating a tilt angle of the handwriting pen according to the sensing data, determining a contact shape according to the tilt angle, determining an ink output amount according to the contact time, and determining a handwriting image according to the contact trajectory, the contact shape and the ink output amount; and displaying the handwriting image.

12. The handwriting input method of claim 11, wherein when the contact time is less than a threshold, the ink output amount increases as the contact time increases, and when the contact time is greater than or equal to the threshold, the ink output amount is kept constant.

13. The handwriting input method of claim 11, wherein the ink out amount decreases as a total contact time of the handwriting pen contacting the handwriting plate increases.

14. The handwriting input method of claim 11, further comprising:

displaying a virtual ink palette;

clicking on the virtual ink palette; and recovering a total ink amount.

15. The handwriting input method of claim 11, further comprising:

calculating a speed of the handwriting pen according to the sensing data when the handwriting pen contacts the handwriting plate; and determining the contact shape according to the tilt angle and the speed.

* * * * *